United States Patent
Hashimoto et al.

(10) Patent No.: US 9,828,448 B2
(45) Date of Patent: Nov. 28, 2017

(54) SILYLATED POLYBUTADIENE

(71) Applicant: NIPPON SODA CO., LTD., Tokyo (JP)

(72) Inventors: Hiroki Hashimoto, Ichihara (JP); Taiki Yamate, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 189 days.

(21) Appl. No.: 14/239,707

(22) PCT Filed: Oct. 3, 2012

(86) PCT No.: PCT/JP2012/075664
§ 371 (c)(1),
(2) Date: Feb. 19, 2014

(87) PCT Pub. No.: WO2013/051613
PCT Pub. Date: Apr. 11, 2013

(65) Prior Publication Data
US 2014/0206789 A1 Jul. 24, 2014

(30) Foreign Application Priority Data

Oct. 6, 2011 (JP) .................. 2011-221960

(51) Int. Cl.
| | |
|---|---|
| C08F 36/06 | (2006.01) |
| C08F 36/14 | (2006.01) |
| C08C 19/25 | (2006.01) |
| C08L 15/00 | (2006.01) |
| C08K 5/14 | (2006.01) |
| C08F 236/06 | (2006.01) |
| C09D 115/00 | (2006.01) |
| C08K 5/372 | (2006.01) |
| C09J 115/00 | (2006.01) |

(52) U.S. Cl.
CPC .............. *C08F 36/06* (2013.01); *C08C 19/25* (2013.01); *C08F 236/06* (2013.01); *C08K 5/14* (2013.01); *C08K 5/3725* (2013.01); *C08L 15/00* (2013.01); *C09D 115/00* (2013.01); *C09J 115/00* (2013.01)

(58) Field of Classification Search
CPC .... C08F 36/06; C08F 3/24; C08F 3/28; C08F 236/06; C09J 115/00; C08K 5/14; C08K 5/15; C09D 115/00; C08L 15/00; C08J 2315/00
See application file for complete search history.

(56) References Cited

U.S. PATENT DOCUMENTS 3,324,089 A 6/1967 Trepka
4,139,519 A 2/1979 Itoh et al.

FOREIGN PATENT DOCUMENTS

JP A-2005-344110 12/2005
WO 2005/109553 A2 11/2005

OTHER PUBLICATIONS

Guo et al. Catalytic Hydrosilylation of Diene-Based Polymers. 2. Hydrosilylation of Stryene-Butadiene Copolymer and Nitrile-Butadiene Copolymer. Macromolecules, 1992, 25, 883-886.*
Liquid Polybutadiene—NISSO-PB from Nippon Soda Co., Ltd. no date. retrieved from internet. Retrieved on [Sep. 23, 2015]. Retrieved from internet <URL://http://www.nippon-soda.co.jp/pb/list.html#te>.*
Ovchinnikova et al. Adding triphenylsilane in the presence of radical initiators. Leningrad University Herald vol. 22 (4), 1970, pp. 134-140.*
Guo et al., "Catalytic Hydrosilylation of Diene-Based Polymers.\1. Hydrosilylation of Polybutadiene.", Macromolecules, American Chemical Society, Nov. 26, 1990, pp. 5047-5054, vol. 23, No. 24.
Chauhan et al., "Silyl Functionalization of Polyolefins", Macromolecules, American Chemical Society, Mar. 21, 2006, pp. 2010-2012, vol. 39, No. 6.
Apr. 13, 2015 Search Report issued in European Patent Application No. 12838482.3.
Ovchinnikova et al., "Addition of triphenylsilane to polybutadiene in the presence of radical initiators," *Vestnik Leningradskogo Universiteta, Seriya* 4, 1971, pp. 134-140, No. 4.
Minoura et al., "Yuki Keiso Suisokabutsu no Fuka ni yoru Gan Keiso Diene Polymer no Gosei," *The Journal of Chemical Industry*, 1965, pp. 1155-1159, vol. 68, No. 6.
International Search Report issued in International Application No. PCT/JP2012/075664 dated Jan. 8, 2013.
Abstract of Ovchinnikova, T.A. et al., "Addition of triphenylsilane to polybutadiene in the presence of radical initiators," Vestnik Leningradskogo Universiteta, vol. 4, No. 22, pp. 134-140 (1971).
Jul. 29, 2015 Office Action issued in Chinese Patent Application No. 201280045277.5.

* cited by examiner

*Primary Examiner* — Sanza McClendon
(74) *Attorney, Agent, or Firm* — Oliff PLC

(57) ABSTRACT

The objective of the present invention is to provide a derivative of polybutadiene suitable as a material of a curable composition for obtaining a cured product having high shearing stress. The present invention provides: a silylated polybutadiene characterized by containing a repeating unit represented by formula (I) (in the formula: $R^1$, $R^2$, and $R^3$ each independently represents an unsubstituted or substituted aryl group, an alkyl group, or an aralkyl group. Among $R^1$ to $R^3$, at least one of $R^1$ to $R^3$ is an aryl group or aralkyl group); a curable composition characterized by containing the silylated polybutadiene and a polymerization initiator; and a cured product obtained by curing the curable composition.

[Chemical Formula 1]

$$-\!\left(\!\begin{array}{cc}H_2 & H\\ C - C\end{array}\!\right)\!-\\ \quad\quad\quad |\\ \quad\quad\quad CH_2\\ \quad\quad H_2C\!\diagup\\ R^1\!-\!\underset{|}{\overset{}{Si}}\!-\!R^3\\ \quad\quad R^2$$

(I)

8 Claims, No Drawings

SILYLATED POLYBUTADIENE

TECHNICAL FIELD

The present invention relates to a polybutadiene in which a portion thereof is silylated, and a curable composition of the polybutadiene.

The present application claims priority on the basis of Japanese Patent Application No. 2011-221960, filed in Japan on Oct. 6, 2011, the contents of which are incorporated herein by reference.

BACKGROUND ART

In the past, a polybutadiene in which a portion of double bonds of the side chains are silylated is known. For example, a curable composition containing a polybutadiene in which silyl groups are added to a portion of carbon-carbon double bonds of the side chains and a carbonaceous material is suggested in Patent Document 1. Concretely, a curable composition containing a polybutadiene in which 20.5% or 25.2% of carbon-carbon double bonds of the side chains are triethylsilylated is disclosed. Since the cured product obtained from the curable composition has excellent heat and water resistance, conductive properties, and the like, applications such as a separator for fuel cell, an electrode, an electromagnetic shield, a heat release material, an assembly for a battery, and the like, are proposed.

PRIOR ART DOCUMENTS

Patent Documents

Patent Document 1: Japanese Patent Application Publication No. 2005-344110

DISCLOSURE OF THE INVENTION

Problems to be Solved by the Invention

On the other hand, higher adhesion properties are required in the cured product obtained by curing the curable composition containing polybutadiene and the derivative of the polybutadiene. However, with regard to the curable compositions containing polybutadiene in which a portion of the double bonds of the side chains is silylated, there have been no curable compositions when used for producing the cured products, the cured products having preferable and high shearing stress as the adhesives were not obtained.

Therefore, an object of the present invention is to provide polybutadiene derivatives which are preferable as materials of the curable compositions used to obtain cured products having a high shearing stress.

In addition, a thin-film material having a high refractive index is required in the field of the thin-film material. Another object of the present invention is to provide a thin-film material having a high refractive index.

As a result of conducting extensive studies to achieve the aforementioned problems, the inventors of the present invention found that the curable compositions having a high shearing stress can be obtained by using polymers in which the double bonds of the side chains of a polybutadiene are added with silyl groups at a certain ratio. In addition, the inventors of the present invention found that the thin-film materials obtained by curing such polymers have a high refractive index, thereby achieving the present invention.

Namely, the present invention provides the following (1) to (8).

(1) A silylated polybutadiene containing a repeating unit represented by formula (I):

[Chemical Formula 1]

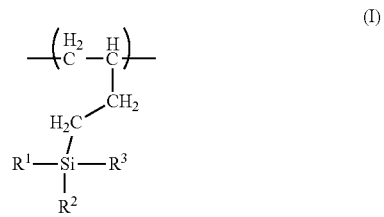

(In formula (I), $R^1$, $R^2$ and $R^3$ each independently represents an unsubstituted or substituted aryl group, an alkyl group or an aralkyl group. Among $R^1$ to $R^3$, at least one of $R^1$ to $R^3$ is an aryl group or an aralkyl group).

(2) The silylated polybutadiene according to (1), wherein the silylated polybutadiene contains 1 to 50 mole % of the repeating units represented by formula (I) based on total repeating units.

(3) The silylated polybutadiene according to (1) or (2), wherein the silylated polybutadiene is obtained by sililating polybutadiene comprising 75 to 100 mole % of repeating units represented by following formula (II) and 0 to 25 mole % of repeating units represented by following formula (III).

[Chemical Formula 2]

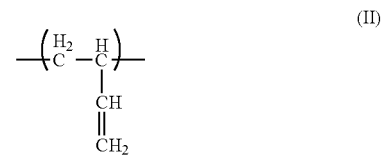

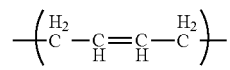

(4) The silylated polybutadiene according to any one of (1) to (3), wherein the number average molecular weight is 500 to 10,000.
(5) A curable composition containing the silylated polybutadiene according to any one of (1) to (4) and a polymerization initiator.
(6) A cured product obtained by curing the curable composition according to (5).
(7) An adhesive containing the silylated polybutadiene according to any one of (1) to (4) and a polymerization initiator.
(8) A composition for forming a thin-film containing the silylated polybutadiene according to any one of (1) to (4) and a polymerization initiator.

Effects of the Invention

The curable composition containing silylated polybutadiene of the present invention has excellent shearing stress when the composition is cured. Because of this feature, the curable composition is useful as a material of various adhesives such as solvent type adhesive and two pack type acrylic adhesive, and the like, and as a material of thin films such as various coating films, and the like. In addition, the thin film obtained by curing the curable composition containing silylated polybutadiene of the present invention has a high refractive index.

BEST MODE FOR CARRYING OUT THE INVENTION

<Silylated Polybutadiene>

The silylated polybutadiene of the present invention is characterized in that it contains the repeating units represented by the following formula (I). The ratio of the repeating units represented by formula (I) based on the total repeating units is not particularly limited. In view of the fact that the cured product obtained by curing the curable composition having a high adhesiveness, the silylated polybutadiene preferably contains 1 to 30 mole % of the repeating units represented by formula (I) based on the total repeating units. In view of the fact that the cured product obtained by curing the curable composition has a high refractive index, the silylated polybutadiene preferably contains 1 to 50 mole % of the repeating units represented by formula (I) based on the total repeating units. In formula (I), $R^1$, $R^2$ and $R^3$ each independently represents an unsubstituted or substituted aryl group, an alkyl group or an aralkyl group. Among $R^1$ to $R^3$, at least one of $R^1$ to $R^3$ is an aryl group or an aralkyl group.

[Chemical Formula 3]

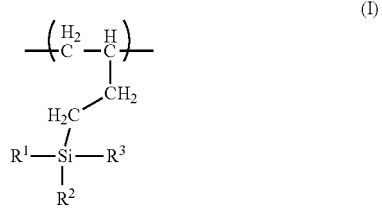

(I)

An aryl group of $R^1$ $R^2$ or $R^3$ may be a monocyclic aryl group or a polycyclic aryl group. The aryl group can be specifically exemplified by a phenyl group, a 1-naphtyl group, a 2-naphtyl group, and the like. Among these, a phenyl group is preferable.

The number of the substituents in the aryl group of $R^1$ $R^2$ or $R^3$ is not particularly limited. $R^1$ $R^2$ or $R^3$ may each independently contain one substituent, and may each independently contain two or more substituents.

The substituent in the aryl group of $R^1$ $R^2$ or $R^3$ can be specifically exemplified by a halogen atom such as a fluorine atom, a chlorine atom, a bromine atom and an iodine atom, and the like, a cyano group, a nitro group, an alkyl group, an alkoxy group, an aryl group, and the like. Examples of the alkyl group include a linear or branched group having 1 to 6 carbon atoms such as a methyl group, an ethyl group, an n-propyl group, an i-propyl group, an n-butyl group, an s-butyl group, an i-butyl group, an s-butyl group, a t-butyl group, an n-pentyl group, an n-hexyl group, and the like. Examples of the alkoxy group include a linear or branched group having 1 to 4 carbon atoms such as a methoxy group, an ethoxy group, an n-propoxy group, an isopropoxy group, an n-butoxy group, an i-butoxy group, an s-butoxy group, a t-butoxy group, and the like. Examples of the aryl group include a monocyclic or bicyclic group such as a phenyl group, a 1-naphthyl group, a 2-naphthyl group, and the like. The substituent in the aryl group of $R^1$ $R^2$ or $R^3$ is preferably an alkyl group or an alkoxy group, and is more preferably a linear or branched alkyl group having 1 to 6 carbon atoms or a linear or branched alkoxy group having 1 to 4 carbon atoms.

An alkyl group of $R^1$ $R^2$ or $R^3$ means a linear or branched alkyl group having 1 to 20 carbon atoms. Examples of the alkyl group include a methyl group, an ethyl group, a propyl group, an isopropyl group, a butyl group, an isobutyl group, a sec-butyl group, a tert-butyl group, a pentyl group, an isopentyl group, a hexyl group, an isohexyl group, an octyl group, and the like.

As the substituent group in the alkyl group of $R^1$ $R^2$ or $R^3$, it is possible to include the same substituents as those exemplified in the aryl group.

An aralkyl group of $R^1$ $R^2$ or $R^3$ means a group in which the aryl and the alkyl are bonded, and examples of the aralkyl group include benzyl, 1-phenylethyl, 2-phenyl ethyl, 1-naphthylmethyl, 2-naphthylmethyl, and the like.

In addition, each aryl group, each alkyl group, each aralkyl group of $R^1$ $R^2$ or $R^3$ may be the same group and may be the deferent group. For the silylated polybutadiene of the present invention, $R^1$ $R^2$ and $R^3$ are preferably each independently unsubstituted or substituted aryl groups, more preferably $R^1$ $R^2$ and $R^3$ are more preferably each independently unsubstituted or substituted phenyl groups, even more preferably, all of $R^1$ $R^2$ and $R^3$ are each independently unsubstituted phenyl groups or phenyl groups substituted with alkyl groups or alkoxy groups, and particularly preferably, all of $R^1$ $R^2$ and $R^3$ are unsubstituted phenyl groups.

The cured product of the silylated polybutadiene of the present invention shows high shearing stress and the cured film of the silylated polybutadiene shows high refractive index since the silylated polybutadiene contains the repeating units represented by formula (I). The content rate of the repeating units represented by formula (I) based on the total repeating units of the silylated polybutadiene of the present invention is preferably 1 to 50 mole %, more preferably 1 to 30 mole %, even more preferably 1 to 25 mole %, much more preferably 1 to 20 mole %, particularly preferably 1 to 15 mole %, more particularly preferably 1 to 10 mole %, most preferably 2 to 9 mole %.

In addition to the repeating unit represented by formula (I), the silylated polybutadiene of the present invention preferably contains at least one kind of repeating unit selected from a group consisting of a repeating unit represented by the following formula (II) and a repeating unit represented by the following formula (III). A portion of the double bonds in formula (II) and formula (III) may be hydrogenated (addition of hydrogen causes saturated carbon-carbon bonds). In addition, the double bonds in formula (III) may be either cis- or trans-bonds. Furthermore, the repeating units of formula (III) whose double bonds are cis-bonds and the repeating units of formula (III) whose double bonds are trans-bonds may co-exist in a single molecule of the silylated polybutadiene.

[Chemical Formula 4]

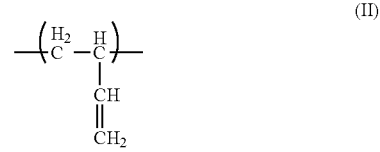

(II)

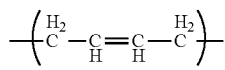
(III)

The sum of the repeating units represented by formula (I) and the repeating units represented by formula (II) is preferably 75 to 100 mole %, and more preferably 80 to 100 mole % based on the total repeating units of the silylated polybutadiene of the present invention. In addition, the amount of the repeating units represented by formula (III) is preferably 0 to 25 mole %, and more preferably 0 to 20 mole % based on the total repeating units of the silylated polybutadiene of the present invention.

The terminal structure of the silylated polybutadiene of the present invention is not particularly limited, and the variously modified terminal structure of the polymer can be used. Examples of them include various structures such as a terminal structure modified with a hydroxyl group, an acrylic-modified terminal structure, a methacrylic-modified terminal structure, a terminal structure modified with a carboxylic group, and the like. However, examples of them are not limited to the above structures.

The molecular weight of the silylated polybutadiene of the present invention is not particularly limited. The number average molecular weight (Mn) of the silylated polybutadiene of the present invention measured by GPC (gel permeation chromatography) method using polystyrene as an index, is preferably 500 to 10,000, and more preferably 1,000 to 5,000.

The dispersion degree (Mw/Mn) of the silylated polybutadiene of the present invention is preferably 1.01 to 4.00, more preferably 1.01 to 3.00, and even more preferably 1.01 to 2.50.

<A Process for Producing the Silylated Polybutadiene>

The silylated polybutadiene of the present invention may be prepared by any method. For example, it can be produced by reacting a polybutadiene with a silane compound represented by the following formula (IV) in the presence of a catalyst.

[Chemical Formula 5]

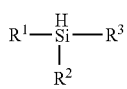
(IV)

In formula (IV), $R^1$, $R^2$, or $R^3$ is the same as shown in formula (I). Examples of silane compounds represented by formula (IV) include triphenylsilane, tris(4-methylphenyl)silane, tris(4-ethoxy-phenyl)silane, dimethylphenylsilane, ethylmethylphenylsilane, diethylphenylsilane, and the like, and triphenylsilane is more preferable among them.

The polybutadiene reacted with a silane compound preferably contains 1 mole % or more of the repeating units represented by formula (II) based on the total repeating units. However, it is not particularly limited. In addition to the repeating units represented by formula (II), the raw material of the silylated polybutadiene of the present invention preferably contains the repeating units represented by formula (III). Furthermore, the raw material of the silylated polybutadiene of the present invention is more preferably a polybutadiene comprising 75 to 100 mole % of the repeating units represented by formula (II) and 0 to 25 mole % of the repeating units represented by formula (III).

Examples of the polybutadiene comprising 75 to 100 mole % of the repeating units represented by formula (II) and 0 to 25 mole % of the repeating units represented by formula (III) concretely include NISSO-PB B-1000, NISSO-PB B-2000, NISSO-PB B-3000 (manufactured by Nippon Soda Co., Ltd.), and the like.

The amount of the silane compounds used in the silylation reaction can be appropriately determined depending on that how much mole % of the total repeating units in the polybutadiene are silylated. 1 mole of the silane compounds is preferably used for 1 mole of the repeating units which are aimed to be silylated. In addition, an excess amount of the silane compounds can be used for 1 mole of the repeating units which are aimed to be silylated. When the excess amount of the silane compounds is used, the objective silylated polybutadiene can be obtained by terminating the reaction when the reaction has proceeded to the objective silylation rate.

The catalyst used in the silylation reaction is not particularly limited provided that the catalyst has the activity for hydrosilylation reaction. However, the catalyst is preferably a platinum catalyst. Examples of the platinum catalyst include platinum-olefin complex, platinum-vinyl siloxane complex, hexachloroplatinic (IV) acid, and the like.

Although the reaction temperature of the silylation reaction is not particularly limited, 50° C. to 150° C. is preferable, 80° C. to 130° C. is more preferable. The reaction time of the silylation reaction is not particularly limited, and it can be appropriately determined on the basis of the desired silylation rate.

The solvent used in the silylation reaction is not particularly limited as long as polybutadiene can dissolve in the solvent. Examples of the solvent include the non-polar solvents such as toluene, xylene, ethylbenzene, cyclohexane, hexane, benzene, diethyl ether, chloroform, and the like, among these, benzene, toluene, xylene and ethylbenzene are preferable.

When performing the silylation reaction under such conditions, the silane compound does not bind to the double bonds of the main chain which is generated by 1,4-bonds, and most of the silane compounds bind to the double bonds of the side chains which is generated by 1,2-bonds. In addition, the silylation reaction to the double bonds of the side chains proceeds in anti-Markovnikov type.

The methods to verify the microstructure of the synthesized silylated polybutadiene are not particularly limited and the microstructure may be confirmed in any way. For example, it is possible to carry out nuclear magnetic resonance method (hereinafter, abbreviated as "NMR method") and Fourier transform infrared spectroscopy method (hereinafter, abbreviated as "FT-IR method"), and the like. Examples of these methods, for instance, are described in the section "Experimental Example 223 Measurement of the Microstructure of Polybutadiene by Infrared Spectrum" (page 45) of "Experimental Methods of Polymer Synthesis (8th Printing issued on Mar. 1, 1984, issued by Kagakudojin Co., Ltd.)", the section "Experimental Example 225 Measurement of the Microstructure of Polybutadiene by NMR" (page 49) of "Experimental Methods of Polymer Synthesis (8th Printing issued on Mar. 1, 1984, issued by Kagakudojin Co., Ltd.)" and the section "Experimental Example 226 Measurement of the Microstructure of Polyisoprene by NMR" (page 51) of "Experimental Methods of Polymer Synthesis (8th Printing issued on Mar. 1, 1984, issued by Kagakudojin Co., Ltd.)".

<Curable Composition and Cured Product>

The curable composition is obtained by adding other ingredients for curing the silylated polybutadiene to the silylated polybutadiene of the present invention.

In the present invention and the present specification the curable composition means a composition prior to be cured, the cured product means the one obtained by curing the curable composition.

The curable composition of the present invention is characterized in that it contains the silylated polybutadiene of the present invention and a polymerization initiator. The curable composition of the present invention may contain only one kind of the silylated polybutadiene of the present invention and may contain a mixture of two or more kind of the silylated polybutadienes having different compositions.

The polymerization initiator contained in the curable composition of the present invention is not particularly limited, but thermal polymerization initiator or photopolymerization initiator is preferred.

Examples of the thermal polymerization initiator include peroxides such as inorganic peroxides, organic peroxides, and the like. In addition, the curable composition of the present invention may contain one kind of peroxide and may contain a mixture of two or more peroxides.

Examples of the inorganic peroxide include hydrogen peroxide, peracetic acid, and the like.

Examples of the organic peroxide include hydroperoxides such as t-butyl hydroperoxide, p-menthane hydroperoxide, cumene hydroperoxide, diisopropylbenzene hydroperoxide, and the like; peroxy esters such as t-butylperoxy laurate, t-butylperoxy benzoate, t-butylperoxy decanoate, and the like; peroxy ketals such as 1,5-di-t-butyl peroxy-3,3,5-trimethyl cyclohexane, and the like; ketone peroxides such as ethyl acetoacetate peroxide, and the like; diacyl peroxides such as benzoyl peroxide, and the like. Other examples of the organic peroxide include benzoin, benzoin isopropyl ether, benzoin isobutyl ether, 2,2-diethoxyacetophenone, 2,2-dimethoxyphenyl acetophenone, 2-ethyl anthraquinone, 1,3-di(tert-butyldioxycarbonyl)benzophenone, 4,4'-tetrakis (tert-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethane-1-one (Irgacure 651, manufactured by Ciba Specialty Chemicals Co., Ltd.), 1-hydroxy-cyclohexyl-phenyl-ketone (Irgacure 184, manufactured by Ciba Specialty Chemicals Co., Ltd.), 2-benzyl-2-dimethylamino-1-(4-morpholinophenyl)-butane-1-one (Irgacure 369, manufactured by Ciba Specialty Chemicals Co., Ltd.), bis($\eta^5$-2,4-cyclopentadien-1-yl)-bis(2,6-difluoro-3-(1H-pyrrol-1-yl)-phenyl)titanium (Irgacure 784, manufactured by Ciba Specialty Chemicals Co., Ltd.), dicumyl peroxide (DCP), t-butylperbenzoate (TBPB), t-butylperoxyhexyne-3, and the like.

Examples of the photopolymerization initiator include benzophenone, p,p'-diethylamino benzophenone, benzoin isopropyl ether, benzyl dimethyl ketal, benzyl dimethyl acetal (Irgacure 651; manufactured by Ciba-Geigy), Irgacure 184, Irgacure 907 (both manufactured by Ciba-Geigy), diethylthioxanthone, camphorquinone, p-dimethylamino chalcone, carbonylbis(diethylaminocoumarin), and the like.

The content of the polymerization initiator in the curable composition of the present invention is not particularly limited insofar as the amount can fully cure the silylated polybutadiene. The content of the polymerization initiator in the curable composition of the present invention is preferably 0.1 to 30 parts by weight, and more preferably 0.5 to 30 parts by weight with respect to 100 parts by weight of silylated polybutadiene.

The curable composition of the present invention may further contain a polymerizable vinyl compound. It is possible to carry out the curing reaction by using only a silylated polybutadiene and a polymerization initiator. However, it is possible to carry out the curing reaction even when further adding a polymerizable vinyl compound.

Examples of the polymerizable vinyl compound include aromatic vinyl compounds such as styrene, vinyltoluene, α-methyl styrene, and divinylbenzene, and the like; unsaturated carboxylic acid esters such as methyl(meth)acrylate, 2-hydroxyethyl(meth)acrylate, t-butyl(meth)acrylate, n-hexyl(meth)acrylate, isobutyl(meth)acrylate, cyclohexyl (meth)acrylate, 2-ethylhexyl(meth)acrylate, lauryl(meth) acrylate, stearyl(meth)acrylate, benzyl(meth)acrylate, mono- or di-(meth)acrylate of (poly)ethylene glycol, mono- or di-(meth)acrylate of (poly)propylene glycol, mono- or di-(meth)acrylate of 1,4-butanediol, mono-, di- or tri-(meth) acrylate of trimethylolpropane, and the like; allylated products such as diallyl phthalate, diallyl acrylamide, triallyl(iso) cyanurate, triallyl trimellitate, o,o'-diallyl bisphenol A, o,o'-diallyl bisphenol F, 1,1,1,3,3,3-hexafluoro-2,2-bis(p-hydroxy-o-allyl-phenyl)propane, allylated phenol novolak, 1,1,3-tris-(4-hydroxyphenyl)propane, 1,1,2,2-tetra(4-hydroxyphenyl)ethane, a dehydration condensation product of phenol and hydroxybenzaldehyde, and the like; (poly)oxyalkylene glycol di(meth)acrylates such as (poly)ethylene glycol di(meth)acrylate, (poly)propylene glycol di(meth) acrylate, and the like; terminal acrylic-modified polybutadiene such as TEA-1000, TE-1000, TEAI-1000 (manufactured by Nippon Soda Co., Ltd.); and the like. In addition, examples of the polymerizable vinyl compound include conjugated diene compounds such as butadiene, isoprene, chloroprene, and the like, reactive functional group-containing compounds such as acrylic acid, methacrylic acid, itaconic acid, fumaric acid, glycidyl methacrylate, vinylpyridine, diethylaminoethyl acrylate, N-methyl methacrylamide, acrylonitrile, and the like. The curable composition of the present invention may contain one kind of polymerizable vinyl compound and may contain a mixture of two or more polymerizable vinyl compounds.

The curable composition of the present invention can optionally contain various additives within a range which does not impair the effect of the present invention for the various purposes of improving adhesion properties, improving refractive index, ameliorating solution properties, and the like. Examples of the additive include a thermosetting resin, a thermoplastic resin, a photo-curable resin, an antioxidant, an ultraviolet absorber, a leveling agent, an antifoaming agent, a thickening agent, a flame retardant, a filler, a plasticizer, a pigment, an antistatic agent, a solvent, and the like.

Examples of the thermosetting resin which can be used include, for instance, novolak type phenolic resins such as phenol novolak resin, cresol novolak resin, bisphenol A novolac resin, and the like, phenolic resins such as resole phenolic resin, and the like, bisphenol type epoxy resins such as bisphenol A epoxy resin, bisphenol F epoxy resin, and the like, novolac type epoxy resins such as novolac epoxy resin, cresol novolak epoxy resin, and the like, epoxy resins such as biphenyl type epoxy resin, stilbene type epoxy resin, triphenolmethane type epoxy resin, alkyl-modified triphenolmethane type epoxy resin, triazine nucleus-containing epoxy resin, dicyclopentadiene-modified phenolic type epoxy resin, and the like, urea resin, resins having a triazine ring such as melamine resin, and the like, unsaturated polyester resin, bismaleimide resin, polyurethane resin, diallyl phthalate resin, silicone resin, resins having a benzoxazine ring, cyanate ester resin, and the like.

Examples of the thermoplastic resin which can be used include, for instance, aromatic or aliphatic petroleum resin, rosin resin, terpene resin, coumarone resin, xylene resin, ketone resin, and the like.

Examples of the photo-curable resin which can be used include, for instance, ultraviolet curable resin mainly composed of acrylic compounds, ultraviolet curable resin mainly composed of urethane acrylate oligomer or polyester urethane acrylate oligomer, epoxy resin, vinyl phenolic resin, and the like.

Examples of the antioxidant which can be used include, for instance, hindered phenolic antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-O-cresol, 2-t-butyl-6-(3-t-butyl-2-hydroxy-5-methylbenzyl)-4-methylphenylacrylate, 2,4-di-t-amyl-6-[1-(3,5-di-t-amyl-2-hydroxyphenyl)ethyl]phenylacrylate, 2-[1-(2-hydroxy-3,5-di-tert-pentylphenyl)]acrylate, and the like; sulfur-based antioxidants such as dilaurylthiodipropionate, lauryl stearyl thiodipropionate pentaerythritol tetrakis (β-laurylthiopropionate), and the like; phosphorus-based antioxidants such as tris(nonylphenyl)phosphite, tris(2,4-di-t-butylphenyl)phosphite, and the like.

Examples of the ultraviolet absorber which can be used include, for instance, salicylic acids such as phenyl salicylate, butylphenyl salicylate, octylphenyl salicylate, and the like; benzophenones such as dihydroxybenzophenone, hydroxymethoxybenzophenone, hydroxyoctoxybenzophenone, hydroxydodecyloxybenzophenone, hydroxymethoxysulfobenzophenone, bis(methoxyhydroxybenzoylphenyl)methane, and the like; benzotriazoles such as (hydroxymethylphenyl)benzotriazole, (hydroxybutylphenyl)benzotriazole, (hydroxydibutylphenyl)benzotriazole, (hydroxydibutylmethylphenyl)chloro-benzotriazole, (hydroxydibutylphenyl)chloro-benzotriazole, (hydroxydiamylphenyl)benzotriazole, [hydroxy(tetrahydrophthalimidemethyl)methylphenyl]benzotriazole, and the like; cyanoacrylates such as ethylhexylcyanodiphenylacrylate, ethylcyanodiphenylacrylate, and the like; hindered amines, and the like.

Examples of the leveling agent which can be used include, for instance, known agents such as polyether-modified polydimethylsiloxane, polyester-modified polydimethylsiloxane, aralkyl-modified poly methyl alkyl siloxane, polyester-modified hydroxyl group-containing polydimethylsiloxane, polyetherester-modified hydroxyl group-containing polydimethylsiloxane, acrylic copolymers, methacrylic copolymers, polyether-modified poly methyl alkyl siloxane, acrylate alkylester copolymers, methacrylate alkylester copolymers, lecithin, a mixture thereof, and the like.

Examples of the antifoaming agent which can be used include, for instance, silicone oil, and the like.

Examples of the thickening agent include, for instance, polymethacrylate alkyl homopolymer, copolymer of heterogeneous methacrylate esters, copolymer of methacrylate ester and acrylate ester, acrylic rubber, polyester, polyvinyl chloride, polystyrene, cellulose ester, polyalkyl-α-cyano acrylate, ethylene-vinyl acetate copolymer, and the like. The curable composition of the present invention may contain one kind of thickening agent and may contain a mixture of two or more thickening agents. Examples of the concrete compound as polymethacrylate alkyl homopolymer include, for instance, poly methyl methacrylate (hereinafter, abbreviated as PMMA), poly ethyl methacrylate, poly propyl methacrylate, poly butyl methacrylate, and the like. Examples of the compound used as raw materials of copolymer of heterogeneous methacrylate esters or copolymer of methacrylate ester and acrylate ester include, for instance, methyl methacrylate, ethyl methacrylate, methacrylate-n-propyl, methacrylate-iso-propyl, methacrylate-n-butyl, methacrylate-iso-butyl, methyl acrylate, ethyl acrylate, acrylate-n-propyl, acrylate-iso-propyl, acrylate-n-butyl, acrylate-iso-butyl, and the like.

Examples of the flame retardant which can be used include known inorganic or organic flame retardant, for instance, aluminum hydroxide, antimony oxide, perchloropentacyclodecane, tetrabromobisphenol A, pentabromophenol methacrylate, halogenated epoxy resin, 4-bromophenylmaleimide, 2,4-dibromophenylmaleimide, 2,4,6-tribromophenylmaleimide, oligomers of these bromophenylmaleimides, and the like.

Examples of the filler which can be preferably blended include inorganic fillers such as silica powders such as fused silica, crystalline silica, and the like, alumina, magnesium oxide (magnesia), wollastonite, mica, calcium carbonate, talc, glass, and the like. These fillers may be used with no change as powder, granular, flaked or fibrous filler, or may be used after surface-treated with a coupling agent. In addition, it is possible to use chopped strand products of organic fibers such as Tetron, Vinylon, aromatic polyamide, and the like.

Examples of the plasticizer which can be used include phthalate esters such as dibutyl phthalate, dioctyl phthalate, and the like; phosphoric acid esters such as tricresyl phosphate, diphenyl octyl phosphate, and the like; dibasic acid esters such as dibutyl sebacate, dioctyl sebacate, di-2-ethylhexyl adipate, and the like.

As the pigment, it is possible to use any pigment such as acidic pigments, neutral pigments and basic pigments. For example, as the acidic pigments, barium sulfate and the like can be used, as the neutral pigments, titanium oxide, zinc oxide, amorphous silica, clay, kaolin, calcinated kaolin, talc, satin white, plastic pigments and the like can be used, and as the basic pigment, calcium carbonate, aluminum hydroxide, barium carbonate, magnesium hydroxide and the like can be used.

Examples of the antistatic agent which can be used include quaternary ammonium salts, pyridinium salts, various cationic compounds having a cationic group such as a primary to tertiary amino group, and the like; anionic compounds having a anionic group such as sulfonate base, sulfate ester base, phosphate ester base, phosphonate base, and the like; amphoteric compounds such as amino acid-based compounds, amino sulfate ester-based compounds, and the like; nonionic compounds such as amino alcohol-based compounds, glycerin-based compounds, polyethylene glycol-based compounds, and the like; organometallic compounds such as alkoxides of tin and titanium, and the like, metal chelate compounds such as acetylacetonate salt of them, and the like. In addition, compounds listed above whose molecular weight have been increased can be also used. Furthermore, examples of the antistatic agent which can be used also include monomer or oligomer having tertiary amino groups, quaternary ammonium groups, or metal chelate portion, which is polymerizable by ionizing radiation, and polymerizable compounds such as organometallic compounds such as coupling agent having a polymerizable functional group by ionizing radiation.

Examples of the solvent include aromatic hydrocarbons such as benzene, toluene, xylene, and the like; ester-based solvents such as methyl acetate, ethyl acetate, n-propyl acetate, and the like; polymerizable monomers such as methyl acrylate, ethyl acrylate, methyl methacrylate, ethyl methacrylate, styrene, propylene, and the like; amide-based solvents such as N,N-dimethylformamide, N,N-dimethylacetamide, N-methylpyrrolidone, and the like; ether-based solvents such as diethyl ether, tetrahydrofuran, 1,2-dimethoxyethane, 1,4-dioxane, and the like; nitrile-based solvents such as acetonitrile, benzonitrile, and the like; dimethyl sulfoxide; phosphoric acid amide solvents such as hexamethylphosphorus triamide (HMPT), hexamethylphosphoramide (HMPA), and the like. As the solvents, one kind of solvent may be used and a mixture of two or more solvents may be used.

The silylated polybutadiene of the present invention can be cured with the polymerization initiator by heat, light irradiation, and the like. Accordingly, the curable composition of the present invention can be cured by, for example, heat treatment, light irradiation treatment, and the like.

As the method of heating the curable composition of the present invention, the method is not particularly limited, and a known heating method such as a heater and the like can be used.

As the light irradiation treatment of the curable composition of the present invention, for example, ultraviolet, visible light, X-rays, electron beams and the like can be used.

The methods of irradiating visible light is not particularly limited, for instance, examples of them include the methods using an incandescent bulb, fluorescent lamp, and the like. The methods of irradiating ultraviolet rays is not particularly limited, for instance, examples of them include the methods using a metal halide lamp, a xenon lamp, a low-pressure mercury lamp, a high-pressure mercury lamp, an ultrahigh pressure mercury lamp, and the like, as the methods in which the electrodes are used, and the methods using an excimer lamp, a metal halide lamp, and the like, as the methods in which the electrodes are not used. When using ultraviolet, although the wavelength range thereof is not particularly limited, 150 nm to 400 nm is preferable, 200 nm to 380 nm is more preferable. As the atmosphere for irradiating ultraviolet light, an inert gas atmosphere such as nitrogen gas or carbon dioxide gas, or an atmosphere having a reduced oxygen concentration is preferred, and the normal air atmosphere can be also used. The temperature of the irradiation atmosphere can be normally set to 10 to 200° C.

In the irradiation process of the curable composition of the present invention, it is preferable to use ultraviolet ray. Since the energy of ultraviolet ray is high, it is possible to accelerate the curing reaction by irradiating ultraviolet ray to the curable composition of the present invention, and to accelerate the curing rate of the curable composition, and it is possible to reduce the amount of unreacted curable composition in the cured product.

The cured state of the obtained cured product can be measured by using a Fourier transform infrared spectrometer, a photochemical reaction calorimeter, and the like. By examining the cured state using these devices, curing conditions (light irradiation time, light intensity, etc., the heating temperature, heating time, etc.) can be appropriately selected in order to completely cure the cured product.

EXAMPLES

The following provides a more detailed explanation of the present invention by indicating examples and comparative examples thereof. However, the present invention is not limited to the following examples.

Example 1

Under a stream of nitrogen, a mixture of 2.82 g of triphenylsilane and 51.1 g of toluene was added to 1,2-polybutadiene solution prepared by dissolving 30.0 g of 1,2-polybutadiene (NISSO-PB B-1000 (number average molecular weight (Mn): 1300, 1,2-bond content: 83%, manufactured by Nippon Soda Co., Ltd.)) in 42.0 g of toluene in a flask with a cooling tube, and stirred with a mechanical stirrer. After adding 0.29 g of platinum catalyst (3% Pt-CTS toluene solution (manufactured by N.E. CHEMCAT Co., Ltd.)) to the solution, the mixture was stirred while keeping the internal temperature within 100° C. to 110° C. After confirming the disappearance of triphenylsilane by $^1$H-NMR, the solvent was removed under vacuum concentration, and 28.50 g of triphenylsilylated polybutadiene was obtained. As a result of the measurement of the microstructure by NMR method, the silylation rate of the obtained triphenylsilyl polybutadiene was 2%.

Example 2

Under a stream of nitrogen, a mixture of 6.98 g of triphenylsilane and 39.9 g of toluene was added to 1,2-polybutadiene solution prepared by dissolving 30.0 g of 1,2-polybutadiene (NISSO-PB B-1000 (number average molecular weight (Mn): 1300, 1,2-bond content: 83%, manufactured by Nippon Soda Co., Ltd.)) in 39.7 g of toluene in a flask with a cooling tube, and stirred with a mechanical stirrer. After adding 0.29 g of platinum catalyst (3% Pt-CTS toluene solution (manufactured by N.E. CHEMCAT Co., Ltd.)) to the solution, the mixture was stirred while keeping the internal temperature within 100° C. to 110° C. After confirming the disappearance of triphenylsilane by $^1$H-NMR, the solvent was removed under vacuum concentration, and 27.9 g of triphenylsilylated polybutadiene was obtained. As a result of the measurement of the microstructure by NMR method, the silylation rate of the obtained triphenylsilyl polybutadiene was 5%.

Example 3

Under a stream of nitrogen, a mixture of 13.94 g of triphenylsilane and 43.2 g of toluene was added to 1,2-polybutadiene solution prepared by dissolving 30.0 g of 1,2-polybutadiene (NISSO-PB B-1000 (number average molecular weight (Mn): 1300, 1,2-bond content: 83%, manufactured by Nippon Soda Co., Ltd.)) in 42.0 g of toluene in a flask with a cooling tube, and stirred with a mechanical stirrer. After adding 0.27 g of platinum catalyst (3% Pt-CTS toluene solution (manufactured by N.E. CHEMCAT Co., Ltd.)) to the solution, the mixture was stirred while keeping the internal temperature within 100° C. to 110° C. After confirming the disappearance of triphenylsilane by $^1$H-NMR, the solvent was removed under vacuum concentration, and 27.47 g of triphenylsilylated polybutadiene was obtained. As a result of the measurement of the microstructure by NMR method, the silylation rate of the obtained triphenylsilyl polybutadiene was 9%.

Example 4

Under a stream of nitrogen, a mixture of 18.8 g of triphenylsilane and 43.2 g of toluene was added to 1,2- polybutadiene solution prepared by dissolving 20.0 g of 1,2-polybutadiene (NISSO-PB B-1000 (number average molecular weight (Mn): 1300, 1,2-bond content: 83%, manufactured by Nippon Soda Co., Ltd.)) in 21.0 g of toluene in a flask with a cooling tube, and stirred with a mechanical stirrer. After adding 0.60 g of platinum catalyst (3 Pt-CTS toluene solution (manufactured by N.E. CHEMCAT Co., Ltd.)) to the solution, the mixture was stirred while keeping the internal temperature within 100° C. to 110° C. After confirming the disappearance of triphenylsilane by $^1$H-NMR, the solvent was removed under vacuum concentration, and 18.0 g of triphenylsilylated polybutadiene was obtained. As a result of the measurement of the microstructure by NMR method, the silylation rate of the obtained triphenylsilyl polybutadiene was 21%.

Example 5

Under a stream of nitrogen, 6.06 g of triphenylsilane was added to 1,2-polybutadiene solution prepared by dissolving 3.60 g of 1,2-polybutadiene (NISSO-PB B-1000 (number average molecular weight (Mn): 1300, 1,2-bond content: 83%, manufactured by Nippon Soda Co., Ltd.)) in 10.61 g of toluene in a flask with a cooling tube, and stirred with a mechanical stirrer. After adding 0.06 g of platinum catalyst (3% Pt-CTS toluene solution (manufactured by N.E. CHEMCAT Co., Ltd.)) to the solution, the mixture was stirred while keeping the internal temperature within 100° C. to 110° C. After confirming the disappearance of triphenylsilane by $^1$H-NMR, the solvent was removed under vacuum concentration, and 9.45 g of triphenylsilylated polybutadiene was obtained. As a result of the measurement of the microstructure by NMR method, the silylation rate of the obtained triphenylsilyl polybutadiene was 37%.

Comparative Example 1

Under a stream of nitrogen, a mixture of 41.4 g of triethylsilane and 36.6 g of toluene was added to 1,2-polybutadiene solution prepared by dissolving 40.0 g of 1,2-polybutadiene (NISSO-PB B-1000 (number average molecular weight (Mn): 1300, 1,2-bond content: 83%, manufactured by Nippon Soda Co., Ltd.)) in 42.7 g of toluene in a flask with a cooling tube, and stirred with a mechanical stirrer. 0.032 g of platinum catalyst (hexachloroplatinic (VI) acid hexahydrate) was added to the solution, then the mixture was stirred while keeping the internal temperature within 100° C. to 110° C. During the stirring, a solution prepared by dissolving 11.37 g of triethylsilane in 20.23 g of toluene was added to the mixture, stirring was continued while keeping the internal temperature within 100° C. to 110° C. After confirming the reaction progress by $^1$H-NMR, the solvent and the excess triethylsilane were removed by vacuum concentration, and 18.0 g of triethylsilylated polybutadiene was obtained. As a result of the measurement of the microstructure by NMR method, the silylation rate of the obtained triethylsilyl polybutadiene was 4%.

Comparative Example 2

Under a stream of nitrogen, a mixture of 6.2 g of triethylsilane and 40.8 g of toluene was added to 1,2-polybutadiene solution prepared by dissolving 30.1 g of 1,2-polybutadiene (NISSO-PB B-1000 (number average molecular weight (Mn): 1300, 1,2-bond content: 83%, manufactured by Nippon Soda Co., Ltd.)) in 40.0 g of toluene in a flask with a cooling tube, and stirred with a mechanical stirrer. After adding 0.31 g of platinum catalyst (3% Pt-CTS toluene solution (manufactured by N.E. CHEMCAT Co., Ltd.)) to the solution, then the mixture was stirred while keeping the internal temperature within 100° C. to 110° C. During the stirring, 17.4 g of triethylsilane and 11.4 g of toluene was added to the mixture, stirring was continued while keeping the internal temperature within 100° C. to 110° C. After confirming the reaction progress by $^1$H-NMR, the solvent and the excess triethylsilane were removed under vacuum concentration, and 29.4 g of triethylsilylated polybutadiene was obtained. As a result of the measurement of the microstructure by NMR method, the silylation rate of the obtained triethylsilyl polybutadiene was 9%.

Comparative Example 3

Under a stream of nitrogen, a mixture of 50.8 g of triethylsilane and 16.1 g of toluene was added to 1,2-polybutadiene solution prepared by dissolving 30.5 g of 1,2-polybutadiene (NISSO-PB B-1000 (number average molecular weight (Mn): 1300, 1,2-bond content: 83%, manufactured by Nippon Soda Co., Ltd.)) in 70.1 g of toluene in a flask with a cooling tube, and stirred with a mechanical stirrer. After adding 0.031 g of platinum catalyst (hexachloroplatinic (VI) acid hexahydrate) to the solution, the mixture was stirred while keeping the internal temperature within 100° C. to 110° C. During the stirring, 8.31 g of triethylsilane and 0.016 g of platinum catalyst (hexachloroplatinic (VI) acid hexahydrate) was added to the mixture, stirring was continued while keeping the internal temperature within 100° C. to 110° C. After confirming the reaction progress by $^1$H-NMR, the solvent and the excess triethylsilane were removed under vacuum concentration, and 25.4 g of triethylsilylated polybutadiene was obtained. As a result of the measurement of the microstructure by NMR method, the silylation rate of the obtained triethylsilyl polybutadiene was 17%.

[Test Example 1] (Shearing Stress Test)

1 g of triphenylsilyl polybutadiene obtained in Example 1 (silylation rate: 2%), was mixed well with 0.02 g of Percumyl D (manufactured by NOF Co., Ltd.) (composition A). 0.01 g of the composition A was evenly coated onto the portion of longitudinal length of 1.25 cm and horizontal width of 2.5 cm of the iron plate whose longitudinal length is 10 cm, horizontal width is 2.5 cm and thickness is 1 mm. Another iron plate was put onto the iron plate coated with the composition A. After heating the stuck iron plates for 3 hours at 110° C. in an oven, followed by heating for 3 hours at 150° C., the iron plates were further allowed to cool to room temperature.

By using the Shimadzu AGS-J (5 kN), peeling was conducted under the conditions in which the distance between grippers for stuck iron plates was 125 mm and the tension rate was 10 mm/min. The maximum value (maximum stress (MPa)) of the stress generated at this time was determined. The results are shown in Table 1.

[Test Examples 2 to 4] (Shearing Stress Test)

Except that triphenylsilyl polybutadiene obtained in Examples 2 to 4 (silylation rate: 5%, 9%, 21%, respectively) was used instead of triphenylsilyl polybutadiene obtained in Example 1, the maximum stress (MPa) at the time of peeling the iron plates stuck by each triphenylsilyl polybutadiene was determined in the same manner as Test Example 1. The results are shown in Table 1.

[Comparative Test Example 1] (Shearing Stress Test)

Except that NISSO-PB B-1000 (Number average molecular weight (Mn): 1300, 1,2-bond content: 83%, manufactured by Nippon Soda Co., Ltd.) was used instead of triphenylsilyl polybutadiene obtained in Example 1, the maximum stress (MPa) at the time of peeling the iron plates stuck by each triphenylsilyl polybutadiene was determined in the same manner as Test Example 1. The results are shown in Table 1.

[Comparative Test Examples 2 to 4] (Shearing Stress Test)

Except that triethylsilyl polybutadiene obtained in Comparative Examples 1 to 3 (silylation rate: 4%, 9%, 17%, respectively) was used instead of triphenylsilyl polybutadiene obtained in Example 1, the maximum stress (MPa) at the time of peeling the iron plates stuck by each triethylsilyl polybutadiene was determined in the same manner as Test Example 1. The results are shown in Table 1.

[Test Examples 5 to 7] (Shearing Stress Test)

Except that the aluminum plate whose longitudinal length is 10 cm, horizontal width is 2.5 cm and thickness is 1 mm was used instead of the iron plate whose longitudinal length is 10 cm, horizontal width is 2.5 cm and thickness is 1 mm, the maximum stress (MPa) was determined in the same manner as Test Examples 1 to 3. The results are shown in Table 1.

[Comparative Test Example 5] (Shearing Stress Test)

Except that the aluminum plate whose longitudinal length is 10 cm, horizontal width is 2.5 cm and thickness is 1 mm was used instead of the iron plate whose longitudinal length is 10 cm, horizontal width is 2.5 cm and thickness is 1 mm, the maximum stress (MPa) was determined in the same manner as Comparative Test Example 1. The results are shown in Table 1.

TABLE 1

| | Type of Plate | Silane Compound | Silylation Rate (%) | Maximum Stress (MPa) |
|---|---|---|---|---|
| Test Example 1 | Iron Plate | Triphenylsilane | 2 | 2.58 |
| Test Example 2 | | | 5 | 10.1 |
| Test Example 3 | | | 9 | 4.36 |
| Test Example 4 | | | 21 | 2.84 |
| Comparative Test Example 1 | | — | 0 | 0.70 |
| Comparative Test Example 2 | | Triethylsilane | 4 | 0.96 |
| Comparative Test Example 3 | | | 9 | 1.05 |
| Comparative Test Example 4 | | | 17 | 0.64 |
| Test Example 5 | Aluminum Plate | Triphenylsilane | 2 | 3.15 |
| Test Example 6 | | | 5 | 5.67 |
| Test Example 7 | | | 9 | 4.92 |
| Comparative Test Example 5 | | — | 0 | 1.25 |

As a result, among Test Examples 1 to 4 and Comparative Test Examples 1 to 4 using an iron plate, the maximum stresses at the time of peeling the stuck iron plates of Test Examples 1 to 4 using a curable composition including the silylated polybutadiene of the present invention were clearly greater than the maximum stresses of Comparative Test Example 1 using the polybutadiene which is not silylated and Comparative Test Examples 2 to 4 using triethylsilyl polybutadiene. In addition, when the aluminum plates were used, the maximum stresses at the time of peeling the stuck aluminum plates of Test Examples 5 to 7 using the curable composition including the silylated polybutadienes of the present invention whose silylation rates are 2 to 9%, were clearly greater than the maximum stresses of Comparative Test Example 5 using the polybutadiene which is not silylated. These results clearly indicate that a cured product having excellent shearing stress can be obtained from the curable composition including the silylated polybutadiene of the present invention.

[Test Example 8] (Refractive Index Evaluation Test)

(Preparation of a Curable Composition)

4 g of triphenylsilyl polybutadiene obtained in Example 1 (silylation rate: 2%) was dissolved in 36 g of methyl isobutyl ketone. 0.16 g of trade name Irgacure 907 (manufactured by BASF Corp.) was added to the solution, to prepare a curable composition.

(Production of a Cured Thin Film)

The curable composition was treated on a silicon wafer of 1 cm×2 cm by a dip-coating method so as to the thickness of 500 nm. After drying for 3 minutes at 80° C., the wafer was subjected to UV curing using belt conveyor-type UV irradiation machine. A cured thin film was obtained by UV irradiation so as to the accumulated UV irradiation dose at 365 nm becomes 2000 mJ/cm$^2$ under the following conditions. High-pressure mercury lamp output: 120 W/cm, UV lamp distance: 9.8 cm.

(Measurement of Refractive Index)

The refractive indexes at 400 nm and 550 nm were measured using spectroscopic ellipsometry (manufactured by J. A. Woollam Japan Co., Ltd.). The results are shown in Table 2.

[Test Examples 9 to 11] (Refractive Index Evaluation Test)

Except that triphenylsilyl polybutadiene obtained in Examples 3 to 5 (silylation rate: 9%, 21%, 37%, respectively) was used instead of triphenylsilyl polybutadiene obtained in Example 1, the refractive index of the cured thin film was measured in the same manner as Test Example 8. The results are shown in Table 2.

Comparative Test Example 6

Except that NISSO-PB B-1000 (silylation rate: 0%) was used instead of triphenylsilyl polybutadiene obtained in Example 1, the refractive index of the cured thin film was measured in the same manner as Test Example 8. The results are shown in Table 2.

TABLE 2

|  | Silylation Rate (%) | Refractive Index 400 nm | Refractive Index 550 nm |
|---|---|---|---|
| Comparative Test Example 6 | 0 | 1.522 | 1.500 |
| Test Example 8 | 2 | 1.538 | 1.515 |
| Test Example 9 | 9 | 1.621 | 1.592 |
| Test Example 10 | 21 | 1.670 | 1.637 |
| Test Example 11 | 37 | 1.634 | 1.600 |

As shown in Table 2, in both cases at 400 nm and 550 nm, Test Examples 8 to 11 using the cured thin film derived from the curable composition including the silylated polybutadienes of the present invention whose silylation rates are 2 to 37%, showed higher refractive indexes compared with Comparative Test Example 6 using the cured thin film derived from the curable composition including the polybutadiene which is not silylated. Especially, in both cases at 400 nm and 550 nm, Test Examples 10 and 11 using the cured thin film derived from the silylated polybutadienes whose silylation rates are 21 to 37%, showed extremely high refractive indexes.

INDUSTRIAL APPLICABILITY

As the cured product, the curable composition containing the silylated polybutadiene of the present invention has an excellent shearing stress. Therefore, the curable composition is useful as various adhesives such as adhesive solvent, two pack type acrylic adhesive, and the like, and as the materials of thin films such as various coatings, and the like. In addition, a thin film obtained by curing the curable composition containing the silylated polybutadiene has a high refractive index. Accordingly, the present invention is extremely useful industrially.

The invention claimed is:

1. A silylated polybutadiene containing a repeating unit represented by formula (I):

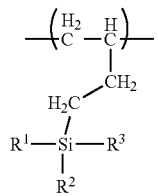

(I)

where $R^1$, $R^2$, and $R^3$ each independently represents an unsubstituted or substituted aryl group, or an aralkyl group, wherein a silylation rate of the silylated polybutadiene is 9 to 37%.

2. The silylated polybutadiene according to claim 1, wherein the silylated polybutadiene is obtained by silylating polybutadiene comprising 75 to 100 mole % of repeating units represented by formula (II) and 0 to 25 mole % of repeating units represented by formula (III):

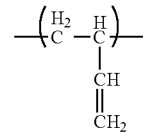

(II)

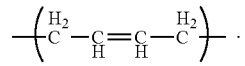

(III)

3. The silylated polybutadiene according to claim 1, wherein a number average molecular weight is 500 to 10,000.

4. A curable composition containing the silylated polybutadiene according to claim 1 and a polymerization initiator.

5. A cured product obtained by curing the curable composition according to claim 4.

6. An adhesive containing the silylated polybutadiene according to claim 1 and a polymerization initiator.

7. A composition for forming a thin-film containing the silylated polybutadiene according to claim 1 and a polymerization initiator.

8. The silylated polybutadiene according to claim 1, wherein in said formula (I), each of $R^1$, $R^2$, and $R^3$ represents a phenyl group.

* * * * *